United States Patent [19]

Head et al.

[11] Patent Number: 4,701,669
[45] Date of Patent: Oct. 20, 1987

[54] COMPENSATED LIGHT SENSOR SYSTEM

[75] Inventors: W. John Head, West Hill; Francis M. Watson, Don Mills, both of Canada

[73] Assignee: Honeywell Inc., Minneapolis, Minn.

[21] Appl. No.: 702,179

[22] Filed: Feb. 15, 1985

[30] Foreign Application Priority Data

May 14, 1984 [CA] Canada .................................. 454231

[51] Int. Cl.⁴ .................... H05B 37/02; H05B 37/04; H05B 41/36
[52] U.S. Cl. ................................. 315/155; 250/205; 315/151; 315/156
[58] Field of Search ....................... 315/155, 156, 151; 250/205

[56] References Cited

U.S. PATENT DOCUMENTS

| 2,052,146 | 8/1936 | Moore | 315/155 X |
| 2,882,450 | 4/1959 | McCabe | 315/155 X |
| 3,449,629 | 6/1969 | Wigert et al. | 315/151 |
| 3,965,388 | 6/1976 | Brisk | 315/155 |
| 4,135,116 | 1/1979 | Smith | 315/156 |
| 4,236,101 | 11/1980 | Luchaco | 315/156 |

FOREIGN PATENT DOCUMENTS 0006366  1/1979  Japan .................................. 315/155

Primary Examiner—Saxfield Chatmon
Attorney, Agent, or Firm—Donald J. Lenkszus

[57] ABSTRACT

A light sensing compensation system is provided for controlling the level of light at a workplane so that the ratio of the light at the ceiling where the sensor means is located to the level of controlled light at the workplane is maintained substantially constant as daylight entering the room varies.

6 Claims, 8 Drawing Figures

COMPENSATED LIGHT SENSOR SYSTEM

BACKGROUND OF THE INVENTION

The present invention relates to a lighting control system for controlling the amount of light at a workplane within a room of a building and, more particularly, to such a system which has a compensation apparatus therein for maintaining the light at the workplane constant even though the amount of sunlight entering the building varies.

The ability to control the level of light within a room of a building by use of wall mounted dimmer switch has given rise to the opportunity of automatically controlling the level of light within the room. Such systems attempt to control the output of the artificial lighting sources within the room as the light within the room changes. The amount of light within the room will change as the sunlight entering the room changes.

Known automatic lighting control systems include a sensor for sensing the amount of light within the room and a controller responsive to the light sensor for regulating the power supplied to the artificial lighting sources in an attempt to adjust the light supplied by the artificial light sources as the sunlight entering the room varies.

Unfortunately, the light distribution pattern of the artificial light sources is different from the light distribution pattern with regard to sunlight. Because these patterns are different, the impact that the artificial light source has on the sensor is not the same as the impact that sunlight has on the sensor. Accordingly, the impact which sunlight has on the sensor will cause the sensor to provide a first output characteristic in response to variations in sunlight but the different impact which the artificial light source has on the sensor will cause the sensor to provide a second output characteristic in response to the artificial light source. Consequently, the artificial light source will not be correspondingly adjusted for variations in sunlight so that the amount of light received at a workplane located within the controlled room will not be maintained constant but will rather vary as the amount of sunlight entering the building varies.

The present invention provides a compensation mechanism so that the impact that the artificial lighting source and the sunlight have on the light sensing apparatus will remain substantially constant as sunlight varies and as the artificial light source is adjusted in response to variations in sunlight.

SUMMARY OF THE INVENTION

The present invention controls the level of light at a workplane within a building, the level of light being supplied from sources of light including sunlight and at least one artificial light source, by compensating for variations in sunlight within the building to produce a substantially constant light level at the workplane. This system includes a light sensor apparatus for sensing the light within the building, a controller connected to the light sensor apparatus and having an output in response to the light sensed by the light sensor apparatus such that the ratio of the light sensed by the light sensor apparatus to the light at the workplane remains substantially constant as light from the sources varies.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
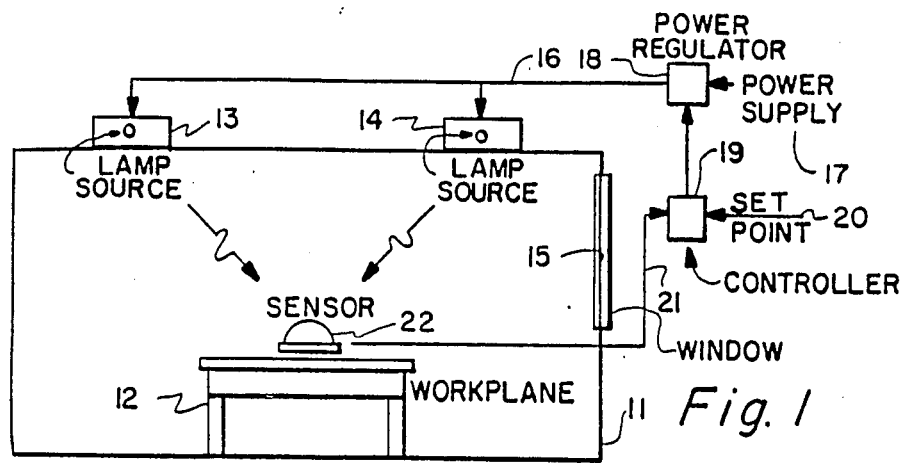
FIG. 1 shows a lighting control system having a single light snesor mounted at the workplane.

FIG. 1 shows room 11 located within a building in which the lighting control system is situated. Within room 11 is located workplane 12 which may be a desk or a table at which light is needed so that the occupant of room 11 can comfortably conduct his work, business or enjoyment.

Light is supplied to workplane 12 from both artificial light sources 13 and 14 and through window 15 from the sun. Light sources 13 and 14 are supplied with electrical energy over lines 16 from power source 17 as controlled by power regulator 18. Power regulator 18 is under control of controller 19. Controller 19 receives a setpoint input 20 and a sensor input 21 from light sensor 22.

Figure 2:
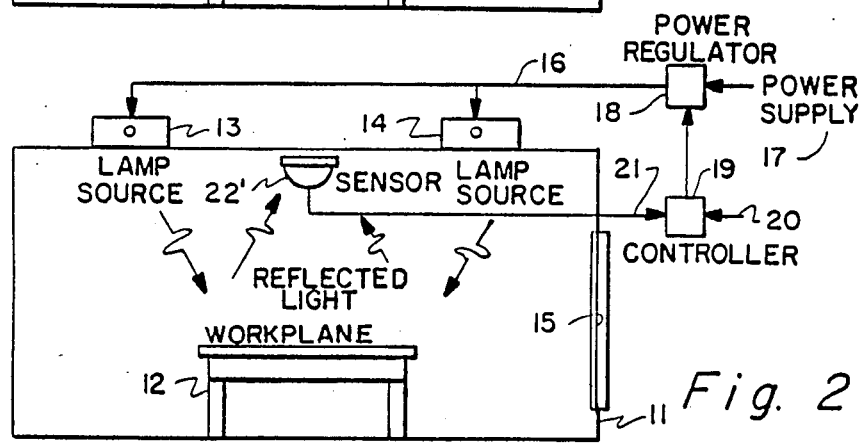
FIG. 2 shows the system of FIG. 1 but wherein the light sensor is mounted at the ceiling.

As shown in FIG. 1, light sensor 22 is located on the workplane 12. It is quite apparent that to locate the light sensor 22 as shown in FIG. 1 is not practical since the control system would be subjected to continual interferences due to the normal activity about the workplane. To overcome this problem, light sensor 22 shown in FIG. 1 is replaced by light sensor 22' which is located at the ceiling as shown in FIG. 2. In this manner, the activities of the user of this system or the papers or work or other materials which the user is using at the workplane area will not interfere with the light sensor.

The type of control system shown in FIGS. 1 and 2, however, are subject to two error related conditions —sensor response errors resulting because sunlight and the light from the artificial light sources cause different sensor responses and daylight distribution pattern errors resulting from differing sunlight distribution within a room or building due to the changing position of the sun in the sky.

Sensor response errors result from the differing impacts that artificial light and sunlight have on the light sensor. In interior control zones, there is only the one available light source, i.e. artificial lighting. In such zones, the workplane light level may be maintained at desirable levels by indirect control. In such a control arrangement and with the sensor located on the ceiling to remove it from interfering activities at the workplane level, the light at the ceiling is controlled at a set level because that is where the sensor is located and, thus, the workplane light is indirectly controlled at a relatively constant level.

Figure 3:
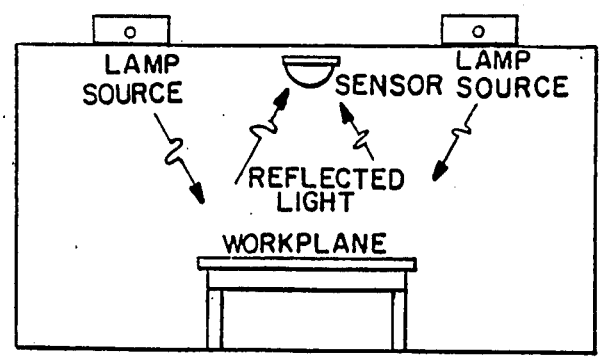
FIG. 3 shows the way in which the light sensor responds to light from the artificial light sources.

Thus, in such as system as shown in FIG. 3, the sensor will respond only to reflected light because, in interior rooms of a building, there is no available sunlight. As shown in FIG. 3, the workplane receives light directly from the artificial light sources while the ceiling receives a lesser amount of light due to reflection of light from the walls, floors, workplane area etc. The foot candle ratio of light available at the ceiling to light available at the workplane may be given, as an example, by the expression $$\text{SENSOR FC/WORKPLANE FC} = 1/5 \quad (1)$$

Since only artificial lighting is used in the arrangement shown in FIG. 3, the sensor FC to workplane FC ratio remains constant through the full range of control setpoints of available light. In the example wherein it is assumed that the ratio given by equation (1) is 1 to 5, it may be desired to indirectly control the workplane at 100 FC. To achieve 100 FC at the workplane level in this example, 20 FC of light must be available at the ceiling located sensors so that controller 19 can control the light at workplane 12 at 100 FC. This indirect control technique can be used successfully for interior zone control.

Unfortunately, indirect control of the workplane by controlling the ceiling light level at a constant value as described above for interior zones is not satifactory in perimeter zones which have windows through which sunlight can pass. In such perimeter or exterior zones or rooms, during periods when daylight is present, sensor response errors will result in an extreme lowering of the light level on the workplane. This result is due to the introduction of an uncontrolled second light source, i.e. daylight, which has a different pattern in the way its light is distributed within the zone.

Figure 4:
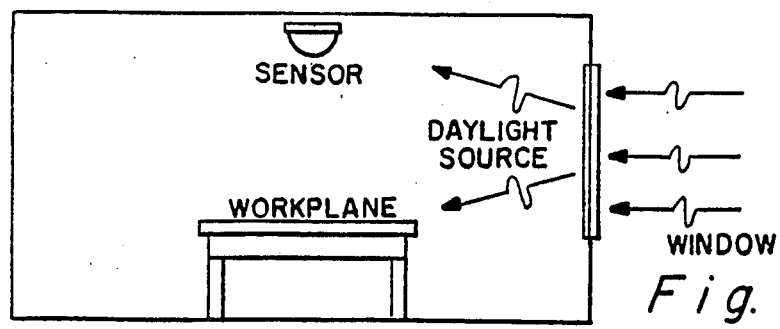
FIG. 4 shows how daylight impinges upon the light sensor.

As shown in FIG. 3, the light from the artificial light sources is reflected back to the sensor. However, as shown in FIG. 4, sunlight entering the room through the window arrives at the sensor both directly and by reflection. Thus, sunlight falls on the ceiling and the workplane in a vastly different relationship than the ratio present with artificial lighting. The ratio due to sunlight may be for example $$\text{SENSOR FC/WORKPLANE FC} = 3/5 \quad (2)$$

Sensor response errors occur because of these different ratios for the two light sources.

This sensor response error can be demonstrated by the above examples where the artificial light source ratio is assumed to be 1/5, the sunlight ratio is assumed to be 3/5, and the desired workplane light level is assumed to be 100 FC. With no daylight present, the 1/5 ratio applicable to artificial lighting will control the ceiling light level at 20 FC. That is, the system is arranged so that the sensor must see 20 FC of light in order to control the workplane area at 100 FC. Assuming that 15 FC of sunlight becomes available in the room, the sensor will now see 35 FC of light, the 20 from the artificial light source and the 15 from sunlight. Because the assumption that sunlight results in a ratio of 3 to 5 between the sunlight which is received by the sensor and the sunlight which is received at the workplane area, the amount of sunlight which is received at the workplane area will be increased by 25 FC to produce a total of 125 FC.

In the control system, however, the sensor will then modulate the artificial light source in order to reduce the amount of light at the ceiling to 20 FC. However, because the system has been established so that the light sensor will operate according to the artificial light source ratio instead of the sunlight source ratio, the light sensor will respond in the 1 to 5 ratio. That is, the control system will be required to reduce the workplane light level 5 FC for a reduction of each 1 FC of light level at the sensor. Thus, the control system must reduce the workplane light level by 75 FC in order to reduce the sensor light level by 15 FC to achieve the desired sensor light level of 20 FC. Because of this change in sunlight, the control system is now controlling the workplane light level at 50 FC instead of the desired 100 FC.

Figure 5:
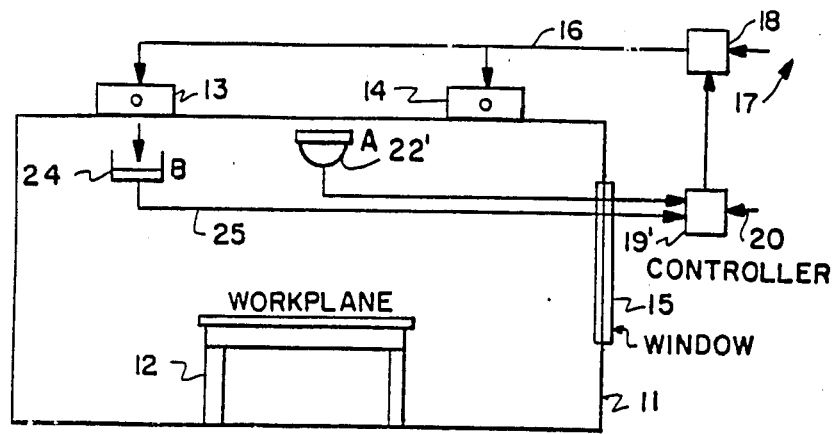
FIG. 5 shows an arrangement in which a first light sensor views the workplane area and a second compensation light sensor responds only to artificial light.

FIG. 5 shows a system which is used to compensate for changes in sunlight in order to maintain the light level at the workplane substantially constant. In FIG. 5, light sensor 22' is again arranged for viewing the workplane area. This light sensor is connected to controller 19' by line 21. Second light sensor 24 is added to the system and arranged for sensing only light from the artificial light source. In this case, light sensor 24 is arranged for sensing the light from artificial light source 13. Light sensor 24 is connected to controller 19' by line 25.

Controller 19' responds to the signals from light sensors 22' and 24 for controlling the artificial light in order to maintain the light at workplane 12 substantially constant.

Controller 19' combines the output signals from sensors 22' and 24 so that the combined signal acts as the sensor input signal to controller 19'. By adjusting the signal strength from compensation light sensor 24, it is possible to tune the total sensor signal so that the sensor FC to workplace FC ratio is the same for both the controlled light source (the artificial lighting) and the uncontrolled light source (sunlight).

Following the above example, sensor 22' can be arranged so that its control impact on the control system is given as $$\text{SENSOR 22' FC/WORKPLANE FC} = 1/5 \quad (3)$$

Similarly, sensor 24 can be arranged so that its influence on the control system is given by $$\text{SENSOR 24 FC/WORKPLANE FC} = 2/5 \quad (4)$$

Thus, in the case of only artificial lighting, the light sensors and controller 19' will control the artificial lighting according to the ratio $$\text{SENSOR 22' FC/WORKPLANE} + \text{SENSOR 24 FC/WORKPLANE FC} = 1/5 + 2/5 = 3/5 \quad (5)$$

As daylight is added and as discussed in connection with FIG. 2, sensor 22' will respond to the daylight in the ratio of 3 to 5 which is the same ratio that sensors 22' and 24 will respond to in connection with artificial light. Since the ratios are the same, changes in sunlight will result in the same light level at the workplane as in the case where there is no sunlight.

In the example, since it is desired to control the workplane at a light level of 100 FC, the ceiling light level in view of the 3 to 5 ratio now established for sensors 22' and 24, will be controlled at a 60 FC light level. When 15 FC of daylight is added, the 3 to 5 ratio indicates that the workplane will increase by 25 FC to 125 FC. The system will respond to reduce the artificial lighting so that the ceiling is again controlled at 60 FC. However, because the same 3 to 5 ratio applies, the light at the workplane will be reduced 25 FC so that the workplane will be be controlled at the desired 100 FC. Thus, the compensation light sensor 24 has allowed the workplane to be controlled at a substantially constant light level even though the amount of daylight entering room 11 may vary.

The controlled light source, i.e. the artificial lighting, will light the room or zone with a fixed light pattern. The uncontrolled light source, i.e. daylight or sunlight, on the other hand, does not produce a fixed light distribution pattern. The daylight entering into room 11 may vary with the distance of the workplane from the windows, with the time of day, with the season or with the climate.

Figure 6:
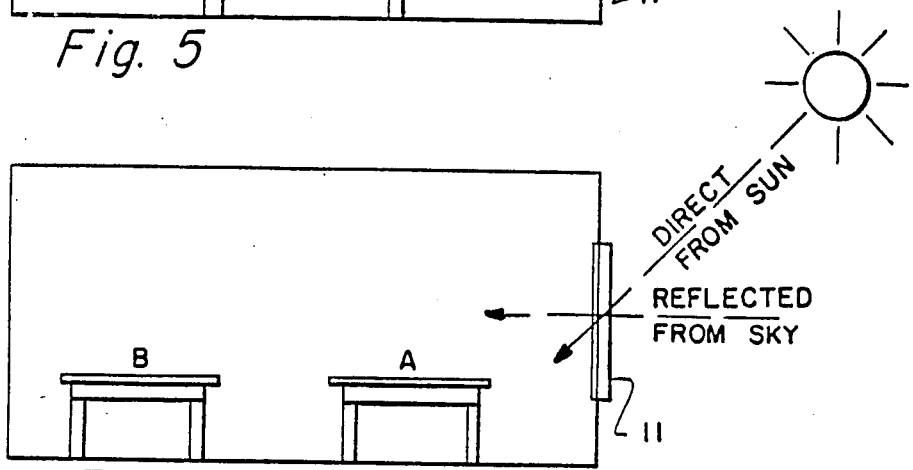
FIG. 6 shows the various components of sunlight.

As shown in FIG. 6, daylight has essentially two components. One component is direct sunlight whereas the other component is reflected light which is sourced from the sun but reflected from the earth, sky and/or clouds. These two components of daylight, as shown in FIG. 6, enter the room differently. Daylight which enters a perimeter window such as window 11 falls off at intensity with distance at right angles to the windows. If direct sunlight is to penetrate very deeply into the room, the sun must be at a low angle in the sky. In the northern hemisphere, the sun is low in the east during the morning, in the west during the evening, and in the south during the high winter months. During the rest of the year, however, workplane B shown in FIG. 6 will receive its daylight illumination only by reflected light. Since reflected light diminishes with distance, the deeper penetration location B will normally receive less daylight than location A.

Figure 7:
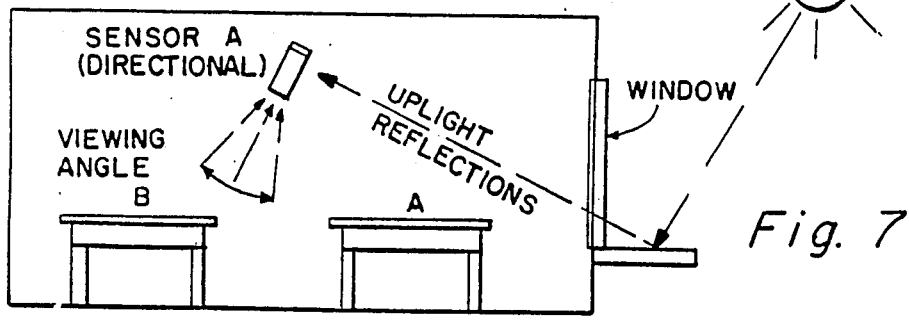
FIG. 7 shows how the light sensor which views the working area can be made directional to reduce or eliminate daylight distribution pattern errors; and, FIG. 8 shows the details of the controller.

While an internal zone ceiling mounted light sensor may have a wide viewing angle in order to respond to light in all directions, it may be more desirable in a daylight or perimeter zone, to confine the viewing angle of the light sensor to the deeper penetration areas. FIG. 7 shows that the light sensor A, which corresponds to sensor 22' in FIG. 5, is made directional both horizontally and vertically so that it may be oriented to view only the workplane area with the deepest penetration from the windows, i.e. workplane B. Thus, sensor A will respond to direct sunlight only when the sunlight is at low elevation such that it will penetrate onto workplane B and upward reflected sunlight from outside surfaces, such as from a snow covered field, will be out of the sensor A viewing angle and thus not cause control errors.

Figure 8:
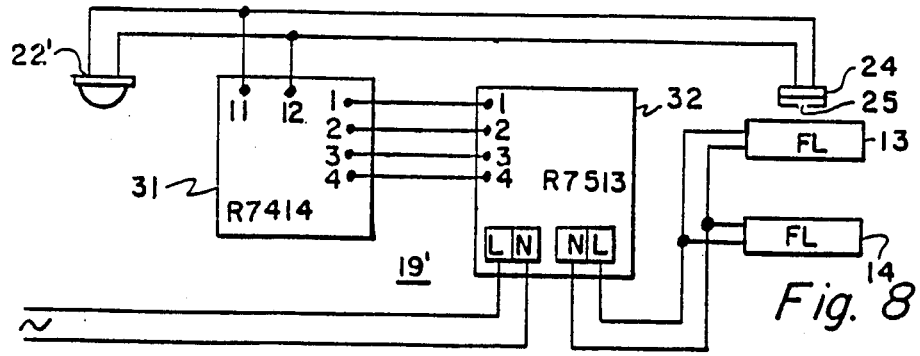

FIG. 8 shows the details of controller 19' shown in FIG. 5. Sensors 22' and 24 are connected to terminals 11 and 12 of control unit 31 which interfaces with power controller 32 for controlling the amount of light produced by fluorescent lamp 13 and 14. Control unit 31 may be a Honeywell R7414 and power control unit 32 may be a Honeywell R7513. Control unit 31 has a setpoint adjust for providing the setpoint function as indicated by input line 20 in FIG. 5. The relative sensor to workplane foot candle ratio is discussed above can be controlled or adjusted by use of a variable aperture or iris 26 associated with sensor 24.

The embodiments of the invention in which an exclusive property or right is claimed are defined as follows:

1. A system for controlling the level of light at a workplane within a building, said level of light being supplied from sources of light including sunlight and at least one artificial light source, said system compensating for variations in sunlight within the building to produce a substantially constant light level at said workplane, said system comprising:

first light sensor means for sensing light at a workplane area within the building;

second light sensor means for sensing only light from said artificial light source;

controller means connected to said first and second light sensor means and having an output such that the ratio of the light sensed by said first and second sensor means to the light at said workplane remains substantially constant as light from said sources varies; and, means responsive to the output of said controller for controlling the level of said artificial light for maintaining a substantially constant level of light at said workplane.

2. The system of claim 1 wherein said first light sensor means is directionally adjustable so that it can view deeper sunlight penetrations within said building.

3. A system for controlling the level of light at a workplane within a building, said level of light being supplied from sources of light including sunlight and at least one artificial light source, said system compensating for variations in sunlight within the building to produce a substantially constant light level at said workplane, said system comprising:

first light sensor means for sensing light at a workplane area within the building;

second light sensor means for sensing only light from said artificial light source;

controller means connected to said first and second light sensor means and having an output for controlling the artificial light source such that said light at said workplane remains substantially constant; and, means responsive to the output of said controller for controlling the level of said artificial light for maintaining a substantially constant level of light at said workplane.

4. The system of claim 3 wherein said first light sensor means is directionally adjustable so that it can view deeper sunlight penetrations within said building.

5. A system for controlling the level of light at a workplane within a building, said level of light being supplied from sources of light including sunlight and at least one artificial light source, said system compensating for variations in sunlight within the building to produce a substantially constant light level at said workplane, said system comprising:

light sensor means for sensing light within said building;

controller means connected to said light sensor means and having an output such that the ratio of the light sensed by said light sensor means to the light at said workplane remains substantially constant as light from said sources varies; and, means responsive to the output of said controller for controlling the level of said artificial light for maintaining a substantially constant level of light at said workplane.

6. The system of claim 5 wherein said light sensor means is directionally adjustable so that it can view deeper sunlight penetrations within said building.

* * * * *

UNITED STATES PATENT AND TRADEMARK OFFICE
CERTIFICATE OF CORRECTION

PATENT NO. : 4,701,669

DATED : October 20, 1987

INVENTOR(S) : W. John Head, Francis M. Watson

It is certified that error appears in the above-identified patent and that said Letters Patent is hereby corrected as shown below:

ON THE TITLE PAGE,

(73) Assignee is Honeywell Limited, Scarborough, Ontario, Canada

Signed and Sealed this

Fifteenth Day of March, 1988

Attest:

DONALD J. QUIGG

*Attesting Officer*  *Commissioner of Patents and Trademarks*